United States Patent
Sawtell et al.

(10) Patent No.: US 7,800,037 B2
(45) Date of Patent: Sep. 21, 2010

(54) POWER SUPPLY CONTROL CIRCUIT WITH OPTICAL FEEDBACK

(76) Inventors: Carl Keith Sawtell, 3487 McKee Rd., Suite 52, San Jose, CA (US) 95127; Paolo Menegoli, 3487 McKee Rd., Suite 52, San Jose, CA (US) 95127

( * ) Notice: Subject to any disclaimer, the term of this patent is extended or adjusted under 35 U.S.C. 154(b) by 32 days.

(21) Appl. No.: 12/112,742

(22) Filed: Apr. 30, 2008

(65) Prior Publication Data

US 2008/0265133 A1    Oct. 30, 2008

Related U.S. Application Data

(60) Provisional application No. 60/926,658, filed on Apr. 30, 2007.

(51) Int. Cl.
*G01J 1/44* (2006.01)
*G02B 27/00* (2006.01)
*H02M 3/335* (2006.01)
*G05F 1/00* (2006.01)

(52) U.S. Cl. .................... 250/206; 250/551; 363/21.04; 315/291

(58) Field of Classification Search ................ 250/551, 250/227.24, 206, 221, 222.1, 214.1, 214 LA, 250/214 A, 214 LS, 214 C, 214 AL, 552; 363/21.07, 21.22, 21.15, 21.18, 21.04; 315/149, 315/151, 154, 291, 294, 297; 398/79, 147, 398/184; 257/99, 324, 615
See application file for complete search history.

(56) References Cited

U.S. PATENT DOCUMENTS

| 4,320,394 A | * | 3/1982 | John, Jr. | ..................... 340/618 |
| 4,540,952 A | | 9/1985 | Williams | |
| 4,695,936 A | | 9/1987 | Whittle | |
| 4,973,834 A | * | 11/1990 | Kim | ........................... 250/221 |
| 5,949,225 A | * | 9/1999 | Sawtell | ...................... 323/284 |
| 6,301,135 B1 | | 10/2001 | Mammano | |
| 6,693,811 B1 | * | 2/2004 | Bowman et al. | .............. 363/97 |
| 6,885,016 B2 | * | 4/2005 | Worley et al. | ............... 250/551 |
| 7,345,894 B2 | | 3/2008 | Sawtell | |

* cited by examiner

*Primary Examiner*—Georgia Y Epps
*Assistant Examiner*—Don Williams

(57) ABSTRACT

An integrated circuit is disclosed that integrates a low current, high speed optical receiver with the primary side control functions of the power supply. This is further combined with an optical emitter to create a single component for feedback and control, providing improved performance and manufacturing. A method of providing feedback for the power supply using such an integrated optically coupled control circuit is also disclosed.

7 Claims, 3 Drawing Sheets

POWER SUPPLY CONTROL CIRCUIT WITH OPTICAL FEEDBACK

CROSS REFERENCE TO RELATED APPLICATION

This application claims the benefit of prior U.S. Provisional Application Ser. No. 60/926,658, filed Apr. 30, 2007, titled "Power Supply Control Circuit with Integrated Optical Feedback."

FIELD OF THE INVENTION

The present invention is in the field of electronic circuits. The present invention is further in the field of analog integrated circuits and switching semiconductor circuits.

The invention also falls within the field of switching power converters that convert one DC level to another or convert AC power to DC power.

The invention also falls in the field of electronic components that couple signals optically.

BACKGROUND OF THE INVENTION

In electronic power supplies, it is common to require electrical isolation between the source of power and the load. In particular, electronic systems powered from the AC mains will generally be required to provide a safety galvanic isolation between the equipment being powered, with its associated ground connection, and the AC mains, both the hot and neutral wire of the incoming AC power. The power flow is isolated by use of a transformer, typically driven by high voltage power electronics that switch the transformer at high frequency. In order to provide a closed feedback loop between the high voltage power electronics and the isolated low voltage load, an optocoupler is commonly used.

Because of noise and cost requirements, the typical use of these optocouplers calls for the current transfer ratio of the optocoupler to be on the order of unity, such that a current on the order of a milliamp on the secondary side of the power supply creates a feedback control current on the order of a milliamp on the primary side. Use of lower currents leads to poor bandwidth in the phototransistor and the LED. Higher currents are undesirable as the efficiency of the system is compromised by dissipating additional power in the feedback.

Optocoupler Technology

Optocouplers, as are typically used in power supplies consist of two semiconductor die, an emitter and a receiver, in a single package that allows for an optical coupling between the two die but no electrical path between them. The receiver is typically a silicon phototransistor, and the transmitter is a light emitting diode (LED) based on a compound III-V semiconductor such as aluminum gallium arsenide (AlGaAs).

The receiver phototransistor is typically a bipolar transistor of conventional design which is optimized to be sensitive to incident light. This is accomplished by extending the area of the collector-base junction. This junction acts as a photodiode that will create a light-dependent "leakage" current from collector to base, thus providing a base current to drive the device on. This construction allows the photocurrent in the photodiode to be multiplied by the current gain (beta) of the bipolar transistor. This increases the sensitivity of the device compared to a photodiode by two to three orders of magnitude. A disadvantage of the structure is that the photodiode also acts as a junction capacitor from base to collector of the bipolar transistor, with this capacitance being in such a configuration as to act as a feedback "Miller capacitance", slowing the response of the device significantly.

The phototransistor is co-packaged with an LED emitter such that there is an optical path between the two die. The package typically has either four or six leads, depending upon whether the phototransistor has its collector, base, and emitter connected to pins (for a 6 pin configuration) or if only the collector and emitter terminals are connected (requiring four pins with two each for LED emitter and phototransistor receiver). The phototransistor is connected to pins on one side of the package, the LED to pins the opposite. This allows for a significant space between the leads of the two components as required for high voltage isolation. Although it is possible to create packages that can connect more than three connections on each side of the package, there is a significant economy of scale involved if the standard high volume optocoupler package is used.

In production, the repeatability of the optocoupler is not easy to guarantee. The LED emissivity has a minor statistical spread. The optical coupling from the LED to the photodiode portion of the phototransistor can vary somewhat, primarily due to mechanical tolerances of the packaging. The sensitivity of the photodiode has a minor variation. But being a bipolar transistor, the current gain (beta) of the phototransistor can be difficult to maintain over even a 2:1 range. If a high current transfer ratio (CTR) is desired, then the basewidth of the transistor will be made small to increase the beta. As this basewidth is reduced, the statistical variations in beta increase. The beta of the phototransistor tends to dominate the statistical variations in the optocoupler CTR.

In high performance photonic circuits, such as are used for high speed optical communication of digital data, it is unusual to use a phototransistor. Instead, a photodiode is used. Although the photodiode produces significantly less current than a phototransistor of comparable size, the combination of a photodiode with a precision amplifier can be designed for higher performance than a photodiode driving the base of an otherwise "open base" bipolar transistor. Techniques are typically employed to make the circuitry very wideband by operating the photodiode at a constant voltage, such that none of its photocurrent is used to charge or discharge the diode capacitance. The precision amplifiers used, because they convert an input current to an output voltage, are generically known as transimpedance amplifiers, or TIAs. The use of sophisticated photonic circuits has never been viewed as cost-effective in power supply circuits, where the cheaper optocoupler is "good enough" and an order of magnitude cheaper than schemes used in optical digital communications.

Power Supply Overview

The offline power supply generally constitutes two separate circuits. The circuitry on the input high voltage supply (DC or AC), generally referred to as the primary side, there is one or more power switching element, typically bipolar transistors or MOSFETs, and circuitry to turn them on and off. The power transistor(s) drive the primary of a power transformer. In order to power the primary side circuitry, a low voltage supply rail is typically created, often with an additional winding on the transformer which may be rectified and filtered.

An isolated secondary winding of the transformer connects to the output circuitry, generally referred to as the secondary circuit. The secondary circuit includes rectifiers to convert the switching AC from the transformer to a DC current, and there will typically be either capacitors or an LC network to smooth the switched DC back to a low ripple constant voltage. Typically the power supply includes a feedback mechanism to precisely control the output voltage. The information from the secondary side output must be fed back to the primary side in order to close the feedback control loop.

The most common approach is to compare the output voltage to the desired output, and create an integrated error signal. This error signal is fed from secondary to primary via an optocoupler. A control circuit on the primary adjusts the switching pulses so as to minimize communicated error. Typically the control circuit is a pulse width modulator, as is well known in the art. This is generally termed primary side control, as only the reference and error amplifier reside on the secondary side. Alternative implementations may modulate the analog feedback informations, as for example an AM or FM signal that can be transmitted across the isolation barrier via a simple transformer.

A second approach to controlling the power supply, secondary side control, is to place the pulse modulating circuitry directly on the secondary side. This allows a very direct connection between the circuitry measuring the output and the analog control circuitry that controls pulse width. In this case, a simple digital (on/off) pulse signal needs to be sent back to the primary side to control the power switch. This digital information is generally sent back across the isolation boundary via a transformer. Communicating the pulse information via optocoupler is impractical because of the slow speed of the phototransistor. A disadvantage of the secondary control approach is that it is necessary to provide an additional pulse generating circuit on the primary for initial system start-up, as the system must "bootstrap" itself and begin switching and delivering power to the secondary circuitry until the secondary circuitry is sufficiently powered to begin sending pulses back to the primary. Whittle's "kick start" circuit (U.S. Pat. No. 4,695,936) is a classic solution, directly pulsing a primary power transistor only in the absence of secondary control pulses.

Independent of the choice of primary or secondary control, there is a need for the primary side circuitry to bootstrap itself from a high voltage DC supply. Because high voltage devices are cost-prohibitive on integrated circuit devices, a typical solution, referred to as undervoltage lockout (UVLO) is to place a high value bleed resistor (several megohms) from the high voltage rail to the positive supply of the primary side circuit. A reservoir capacitor is charged by the current in this bleed resistor while the control circuitry is held initially in a low current state. When the voltage across the reservoir capacitor approaches the maximum allowable voltage for the control circuitry, the circuit is powered on and will run briefly on the energy stored in the capacitor. Ideally, the power supply will start during this time and an alternate source of supply current can be provided from the operating power supply. Should the reservoir capacitor be significantly discharged, the circuit re-enters its low current "off" state and the reservoir capacitor is allowed to resume charging for another attempt at startup.

A prior art flyback power supply using an optocoupler is illustrated in FIG. 1. The primary side circuit 1 accepts a positive high voltage from terminals BULK to RTN. The secondary circuit 2 provides a positive output voltage between terminals OUT and GND. The two input terminals and the two output terminals are galvanically isolated, the two circuit block being coupled magnetically through the transformer T1 (with windings T1a, T1b, and T1c) and via optocoupler P1 (with LED emitter P1a in the secondary circuit 2 and phototransistor receiver P1b in the primary circuit 1).

In the primary circuit 1, capacitor C1 acts as a bulk storage capacitor. Resistor R1 is used to allow control circuit U1 to start with an undervoltage scheme, and is designed to provide current only sufficient to allow for initial startup. Capacitor C2 acts as the local reservoir capacitor for the undervoltage lockout scheme and as a local decoupling capacitor for controller U1. Controller U1 drives power MOSFET M1, which switches the bulk voltage across the transformer primary T1a. The switching action causes energy to be stored in the inductance of transformer T1, and upon switching MOSFET M1 off, that energy is transferred to secondary windings T1b and T1c, which creates positive voltages across the capacitors C3 and C2, respective.

At startup, controller U1 is held off at low current to allow capacitor C2 to be charged through resistor R1. As capacitor C2 reaches an appropriate voltage, typically 10V-20V, controller U1 turns on and begins switching MOSFET M1. This action allows transformer winding T1c and diode D2 to begin acting as a low voltage power source to provide controller U1 with power on an ongoing basis.

The voltage on the secondary output terminal OUT increases as transformer secondary T1b transfers energy into output capacitor C3. A voltage divider comprising resistors R2 and R3 is used to compare a fixed fraction of the output voltage at terminal OUT to the reference voltage of a reference/amplifier circuit 3, typically a circuit similar to the TL431. A compensation network 4 is used to stabilize the overall control loop. A resistor R5 from the output of reference/amplifier 3 to the LED emitter P1a of optocoupler P1 acts as a voltage-to-current conversion to drive the LED with a feedback signal.

The LED current in P1a is a feedback control signal that is transmitted optically to the phototransistor P1b on the primary. The collector current in the phototransistor P1b is dropped across a load resistor R7 to create feedback voltage that serves as an input into controller U1. Controller U1 is typically a PWM control integrated circuit, which will convert the feedback voltage signal either directly into a pulse-width signal or, more commonly, into a current command signal for a current-mode PWM. As shown in FIG. 1, such a current mode would be accomplished by turning on MOSFET M1 at the beginning of each cycle and monitoring the current flowing jointly in MOSFET M1 and transformer winding T1a by monitoring the voltage across a current sense resistor R6. When the voltage across current sense resistor R6 is comparable to the value commanded by the feedback current flowing in phototransistor P1b, then the drive voltage to MOSFET M1 is terminated and MOSFET M1 is shut off until the next cycle.

Further Integration

Some effort has been made to further integrate the power system by, for instance, placing a secondary side reference/amplifier die, typically a TL431 or equivalent, in the same package as the LED and phototransistor. Although this can reduce the total number of packaged components needed to implement the system, this has minimal impact on cost because the LED requires a large bandgap semiconductor die (e.g. aluminum gallium arsenide) whereas the reference/amplifier die that drives it will typically be silicon, so it is not practical to integrate the functions on a single die. Worley (U.S. Pat. No. 6,885,016) further attempted to integrate secondary circuits by using silicon as the light-emitting element from within a secondary side integrated circuit (theoretically possible but not practical within the confines of standard silicon integrated circuit technology), though this also forced the use of a time-integrating photodetector on primary side to overcome the limitations of the inefficient emitter, resulting in performance much more limited than the standard phototransistor.

Both the phototransistor and the power supply control circuits are typically implemented in silicon, but it is not generally accepted as feasible or practical to implement both functions on a common die. The phototransistor is typically a relatively large die (in order to absorb as much of the available photons as possible) and is therefore economically made in a very simple process in which the cost per unit of area of silicon is small, whereas the economics of the control circuit, typically a relatively complex integrated circuit, tends to follow the general trends of integrated circuit economics, where ever increasing cost per unit area of improved silicon processes is offset by ever shrinking size of the circuits. Further, placing an integrated circuit under a bright source of light can create circuit problems that are difficult to manage, as the same physical phenomenon that creates photocurrents in the phototransistor generally will also generate photocurrents elsewhere on the die.

Photocurrents produced by light intentionally shining on an integrated circuit are not generally predicted by the methodologies used to design and verify integrated circuits, and therefore are seen as unpredictable and as a source of considerable risk when integrated circuits are commingled with photonic components on a single die. Although techniques have been developed to allow for the creation of high speed digital communications via on-chip photonic circuits, these techniques are not implemented in mainstream design tools used for standard analog and mixed signal circuits for power supplies.

It is the objective of the present invention to provide a practical integration of the photonic and control circuits on the primary side of the power supply.

It is a further objective of the present invention to significantly lower the current requirement of the feedback circuitry on the primary side of the power supply.

It is yet a further objective to improve the performance and to lower the statistical variability of the feedback circuitry on the primary side of the power supply.

SUMMARY OF THE INVENTION

Figure 1:
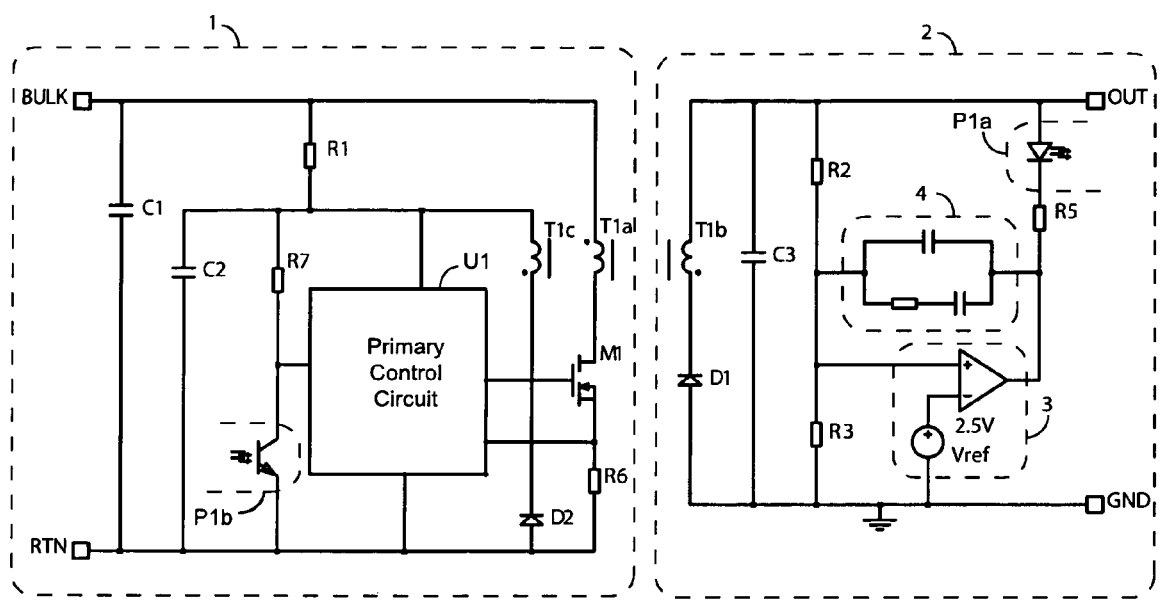
FIG. 1 shows a prior art flyback power supply

The power supply control chip with optical feedback incorporates the general functions typical of power supply control chips, the ability to modulate the switching of a power device in order to control the rate of energy transfer from the primary side of the power supply to the secondary. The control chip may include the power transistor itself. But rather than providing for an electrical input to accomplish feedback, a photodiode in conjunction with a transimpedance amplifier is used.

The use of a photodiode and TIA in the primary side circuit can significantly reduce the operating current required. The older approach requires phototransistor current to be biased to around 1 mA in order to achieve minimal AC performance, a bandwidth on the order of 10 kHz. A photodiode consumes only a few microamperes, and a suitably designed TIA can maintain bandwidths of Megahertz if biased at several hundred microamperes, and can be biased considerably lower and still improve upon performance compared to the phototransistor. Since this current must flow either from the high voltage rail or be processed via an auxiliary low voltage power supply, the effects of this savings on efficiency can be considerable, particularly at low power supply outputs where efficiency is dominated by load-independent losses such as quiescent current.

By placing a photodiode in the power supply control chip, the overall complexity of the system can be significantly reduced. In the three leads of the controller presented to the primary side of the optocoupler package, there need be only a positive supply pin, to be connected to the low voltage rail generated for the control circuits, a ground pin, and an output pin. The output pin can be either the high voltage switching node of a high voltage integrated device, a gate drive signal for driving a conventional switching device, or a high current low voltage output for driving a cascode power device.

Two generic forms of control circuits are feasible for the power supply control chip with optical feedback. The first preferred embodiment assumes primary control with analog feedback. In this scheme, a secondary side error amplifier drives the optocoupler's LED. A photodiode on the control chip senses the light and a transimpedance amplifier creates a control voltage. The control voltage modulates the PWM controller which drives the output pin. The output in turn drives the external power device or, alternately, directly drives the primary of the transformer. Also on the chip is a standard undervoltage lockout scheme.

The second preferred embodiment uses secondary control architecture. A secondary side PWM circuit generates pulses that are fed into the LED. The photodiode on the primary side chip drives a TIA that reconstitutes the digital pulses and a primary side controller directs these pulses to the output pin. When no pulses are available from the secondary, as at startup, a nominal pulse string is generated in the primary side controller to "bootstrap" the system, driving the output in order to operate the power supply open-loop. Once pulses of the expected timing are detected from the secondary, these secondary-side pulses are preferentially chosen to drive the output pin. The chip requires an undervoltage lockout to facilitate startup.

DETAIL DESCRIPTION OF PREFERRED EMBODIMENTS

Figure 2:
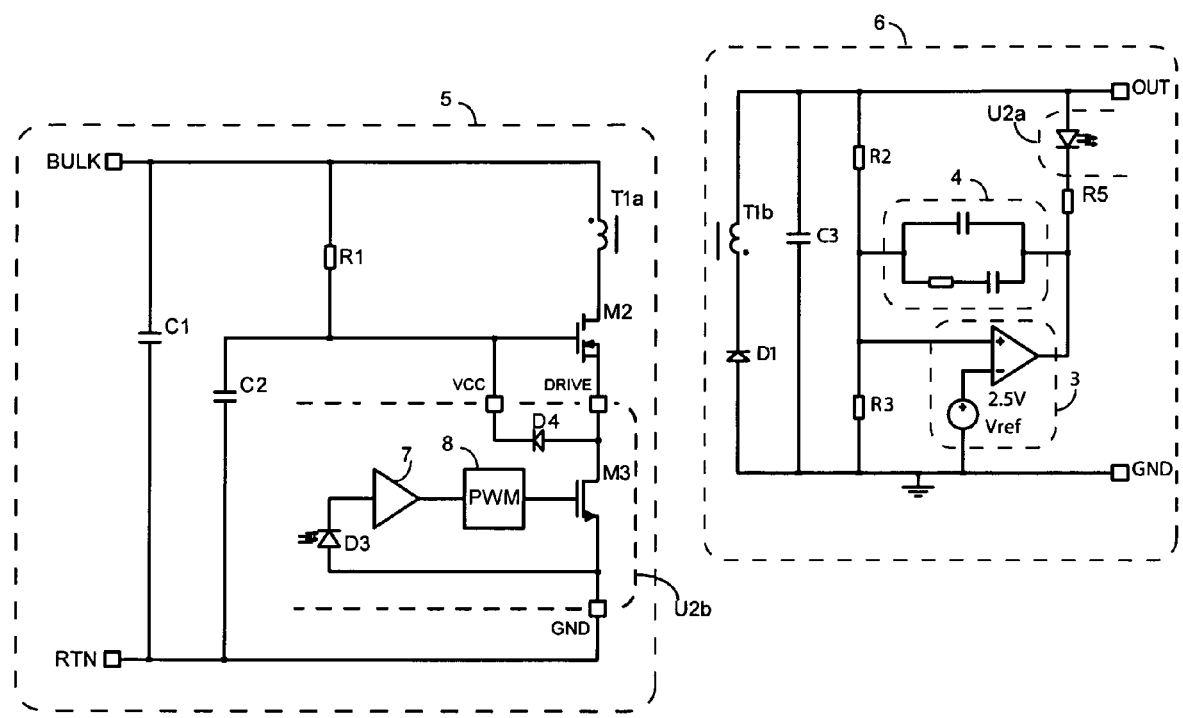
FIG. 2 shows a first embodiment of the invention using continuous feedback

FIG. 2 shows a preferred embodiment of the invention with the optocoupled information being a continuous analog feedback signal as was described in the prior art embodiment of FIG. 1. FIG. 2 has significant similarities to the prior art, and similarly labeled components indicate that their utility and connections are unchanged. The secondary circuit 6 of FIG. 2 is identical to that secondary circuit 2 except that the optocoupler P1 has been replaced by optocoupled controller U2. Controller U2 now contains an optical emitter U2a, preferably an LED as was used in the prior art optocoupler. U2 also contains an integrated circuit controller U2b that includes the functionality of controller U1 of FIG. 1, and additionally photodetection function previously accomplished with phototransistor P1b.

Controller U2b more specifically comprises a photodiode D3 to receive the optocoupled light signal from the LED of U2a. The photodiode D3 is coupled to a transimpedance amplifier 7, which provides a fixed conversion from photocurrent to voltage. This is accomplished while maintaining an effectively constant voltage across the photodiode, such that none of the photocurrent is required to dynamically charge and discharge the capacitance inherent in the photodiode D3. The transimpedance amplifier is coupled to the pulse modulator 8, which is preferably of the current mode variety well known in the art. Although not explicitly shown in U2b nor in pulse modulator 8, it is presumed that those skilled in the art would understand that these would include appropriate oscillators, protection circuits, start-up circuits (UVLO), and similar functionality as is reasonably assumed to a part of a pulse modulating control circuit. The pulse modulation generated by pulse modulator 8 controls the state of an integrated MOSFET M3. M3 is designed to handle the full switch current of the power supply, with an on-resistance that is comparable to the value of a current sense resistor as R6 of FIG. 1. MOSFET M3 may be a low voltage device (i.e. having a breakdown in the 10-20V range) and will therefore be a much smaller device than the external high voltage MOSFET M2.

The implementation shown in FIG. 2 draws on the technique of Sawtell et al. (U.S. Pat. No. 7,345,894) to allow for a reduced component count in the primary circuit 1, and a reduction in the number of pins required for optocoupled controller U2. By driving the source of external power MOSFET M2 with an internal low voltage MOSFET M3 within optocoupled controller U2. It is possible to provide both the on/off control of MOSFET M2 as well as the sensing of the current in MOSFET M2 and Transformer primary winding T1a within the optocoupled controller U2 using a single pin. Additionally, because the gate charge which is used to turn on and off the low voltage MOSFET M3 implemented within the integrated circuit is much lower that the gate charge that would be used turning on and off MOSFET M3, it is possible to significantly reduce the DC quiescent current drawn by optocoupled controller U2, and because no DC current can flow in the gate of MOSFET M2, there is no need to provide a DC power source to power a gate drive circuit for MOSFET M2. As further taught in the referenced prior invention, the switching action of M2, via its inherent drain/body capacitance, will tend to act as a "charge pump" that will, with the aid of diode D4, cause a net DC current to flow into C2 which can be used to power control circuit U2b. The reduction in DC power required within the primary circuit 5 allows for the present invention to operate without the third transformer winding T1c or diode D2 of FIG. 1.

In addition to the reduced component count, the optocoupled controller U2 can provide for improved performance in two ways. First, the optocoupled path from LED emitter to photodiode D3 has similar statistical variations as those in the similar optocoupled path in a standard optocoupler. But whereas the overall loop gain of the power supply of FIG. 1 would vary directly with the current gain of the phototransistor, the equivalent gain error term in this embodiment would be the gain error of the transconductance amplifier, which is typically set by the absolute value of an internal resistor within the transimpedance amplifier 7 and is much more tightly controlled than bipolar transistor beta. Maintaining a more predictable overall loop gain allows for reduction in the design guardband required to guarantee stability over the full range of component tolerances. Second, because the slow optocoupler has been removed, the feedback path is now much higher bandwidth, allowing for the closed loop bandwidth of the control loop to be increased or its transient response to be improved at the existing bandwidth.

Figure 3:
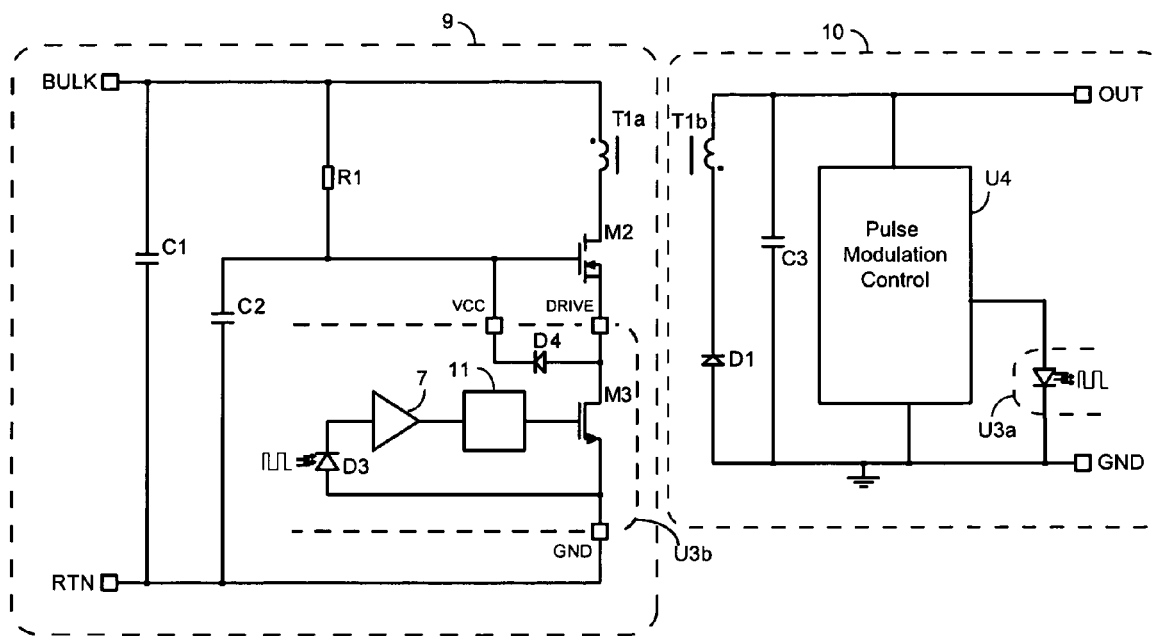
FIG. 3 shows a second embodiment of the invention using pulsed feedback

A second preferred embodiment is illustrated in FIG. 3. In this embodiment, the optocoupled controller U3b within primary circuit 9 receives optically coupled feedback from the secondary circuit 10 which is generated by control circuit U4, with the optically coupled feedback being pulses. The overall architecture of primary controller U3b is similar to that of U2b of FIG. 2, comprising a photodiode D3 and transimpedance amplifier 7 that yields very high response speed, and appropriate handling of the digital pulses that result from the photodiode D3 and transimpedance amplifier 7 being driven from optical pulses. The pulsed output from transimpedance amplifier 7 is an input for primary pulse controller 11.

The basic operation of the flyback converter of FIG. 3 is similar to FIGS. 1 and 2 with respect to the transfer of power via the switching action of MOSFET M2 driving the transformer primary T1a, and the power flow through the transformer to secondary winding T1b and diode D2 to capacitor C3. However, once in normal operation, the secondary control circuit U4 performs the standard pulse modulating functions and determines the timing of switching events, which are transmitted via optical emitter U3a, which is a part of optically coupled controller U3. The primary circuit includes control circuit U3b, which in normal operation serves as a "dumb" gate drive circuit, with primary pulse controller 11 simply passing the pulses received by photodiode D3 and transimpedance amplifier 7 directly to MOSFET M3, turning on and off MOSFET M2 in response to the optical pulses received from optical emitter U3a. This is, under these conditions, a classic example of a secondary control architecture, where all control functions are handled by U4, the controller within secondary circuit 10.

But rather than being a "dumb" optically coupled gate drive circuit, it is required that the primary pulse controller 11 also serves as a means to start the power supply, as the secondary controller U4 is unpowered until the secondary side output voltage is established, and would become unpowered should the secondary side output voltage be forced to a low voltage due to a load fault (e.g. a short circuit at the load.) It is necessary to provide a means of starting the power supply and controlling its operation under fault conditions. These functions are provided by primary pulse controller 11 in a manner that would be clear to one skilled in the art of power supply control.

As shown, primary pulse controller 11 can handle the initial startup of the power supply in a manner identical to that of FIG. 1. An undervoltage lockout circuit maintains controller U3b in a low current "off" mode until the voltage across local reservoir capacitor C2 reaches a reasonable voltage, e.g. 15V. The primary controller U3b then begins driving MOSFET M2 on and off cyclically so as to start the supply. Unlike the scheme of FIG. 1, it will continue to so drive MOSFET M2 independent of the voltages on the secondary, until it senses that it has begun receiving pulses from optical emitter U3a or until the voltage on C2 drops below the lower threshold of the undervoltage lockout circuit. If it begins receiving pulses from optical emitter U3a, primary pulse controller 11 will disable its own cyclical pulsing, and will turn on and off MOSFET M2 in response to pulses received from secondary controller U4 via optical pulses from optical emitter U3a to primary side controller U3b.

After the control of the power conversion is handed of to secondary controller U4, it may still be advantageous to relinquish certain control tasks to primary pulse controller 11. The switch current in MOSFET M2 may be monitored and the MOSFET switched off in circumstances where the current exceeds a preprogrammed value. It may be advisable to similarly monitor the primary side temperature and shut down if the temperature exceeds a predetermined value.

Under the conditions of a load fault such that feedback pulses stop and therefore MOSFET M2 ceases switching, the current drawn by primary control circuit U4b will exceed the DC current available from high value startup resistor R1 and the voltage on capacitor C2 will drop until the undervoltage lockout turns off primary controller U4b. At that point, the voltage across capacitor C2 will begin charging, and eventually the primary control circuit will turn on again and begin pulsing MOSFET M2. The pulsing can be arranged to either continue continuously at very low power, (e.g. high frequency but low duty cycle), continually trying to bring up the secondary control circuit U4, or the switching of the primary controller can be set to provide insufficient "charge pumping" action on the primary to maintain the voltage on capacitor C2 (by switching at larger duty cycle but at a relatively low frequency), such that the voltage on capacitor C2 will drop without the presence of "normal" switching from secondary controller U4 and the system will continuously "bounce" between startup and inactive states. (This is often referred to as a "hiccup" mode).

It will be clear to those skilled in the art that the secondary control circuit U4 may implement any practical control architecture other than peak current mode control, as it has no direct measure of primary side current. It will also be clear that rather than providing complete control of both switching edges of M2, it would be reasonable to allow primary side controller U3b to continue to initiate pulses at a fixed frequency, and use the pulse feedback from secondary controller U4 to determine only the turn-off instant. A wide variety of similar options would be possible using pulse feedback from a secondary controller to a primary side controller of limited functionality. It would also be clear that a compelling reason for the approach of FIG. 3 would be to include more sophisticated control functions, such as driving a synchronous rectifier in place of Diode D1. Many such control functions are most optimally implemented on the secondary.

It is understood that the above description will work with standard power supply architectures such as flyback and forward converters, but the technique described above would also be suitable for any other power architecture. It is also understood that the technique described can be used with conventional ramp-based PWM modulators, with peak- or average-current mode control architectures, or with hysteretic or other free-running control architectures. Alternative architectures, so long as they alter the pulse train in response to the error signal on the secondary, are equivalent for the purposes of this invention. It is also understood that although a source-switched approach to driving MOSFET M2 was shown so as to minimize pin count, a more conventional gate-drive scheme would be easily implemented within the bounds of the described invention.

What is claimed is:

1. A silicon integrated circuit for controlling a power supply, comprising:
    a photodiode for receiving an optical feedback signal;
    a transimpedance amplifier which converts current in said photodiode to a control signal responsive to said feedback signal;
    a pulse controlling circuit for generating pulses in response to said control signal; and
    a driver circuit for controlling a power transistor wherein said transimpedance amplifier, said photodiode, said pulse controlling circuit, and said driver circuit are directly integrated onto a chip.

2. The integrated circuit of claim 1 wherein said optical feedback signal and said control signal are continuous analog signals.

3. The integrated circuit of claim 1 wherein said optical feedback signal and said control signal are pulsed signals.

4. The integrated circuit of claim 1 wherein said power transistor is integrated into said integrated circuit.

5. The integrated circuit of claim 1 wherein said pulse controlling circuit comprises
    an oscillator providing a clock signal at a substantially constant switching frequency; and
    a pulse modulating circuit providing pulses at said substantially constant frequency of said clock signal and at a pulse width responsive to said control signal.

6. The integrated circuit of claim 1 wherein said pulse controlling circuit comprises:
    an oscillator providing a clock signal at a substantially constant switching frequency; and
    a pulse modulating circuit providing pulses at said substantially constant frequency of said clock signal and at a pulse width responsive to said control signal and to instantaneous current flowing in said power transistor.

7. An optocoupled component comprising:
    the integrated circuit of claim 1;
    a light emitting diode (LED);
    a package providing electrical connection to said integrated circuit and said light emitting diode, and an optical path to allow light from said light emitting diode to couple to said photodiode of said integrated circuit.

* * * * *